United States Patent
Nakanishi et al.

(10) Patent No.: US 12,468,093 B2
(45) Date of Patent: Nov. 11, 2025

(54) OPTICAL WIRING AND OPTICAL CONNECTION METHOD

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Tetsuya Nakanishi, Osaka (JP); Masahiro Shibata, Kanagawa (JP); Atsushi Kataoka, Kanagawa (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 325 days.

(21) Appl. No.: 18/020,164

(22) PCT Filed: Sep. 13, 2021

(86) PCT No.: PCT/JP2021/033538
§ 371 (c)(1),
(2) Date: Feb. 7, 2023

(87) PCT Pub. No.: WO2022/059645
PCT Pub. Date: Mar. 24, 2022

(65) Prior Publication Data
US 2023/0288643 A1    Sep. 14, 2023

(30) Foreign Application Priority Data
Sep. 16, 2020   (JP) ................................ 2020-155585

(51) Int. Cl.
*G02B 6/38*  (2006.01)

(52) U.S. Cl.
CPC ......... *G02B 6/3825* (2013.01); *G02B 6/3877* (2013.01); *G02B 6/3881* (2013.01); *G02B 6/3893* (2013.01)

(58) Field of Classification Search
CPC .... G02B 6/3556; G02B 6/356; G02B 6/3825; G02B 6/3877; G02B 6/3881; G02B 6/3893
See application file for complete search history.

(56) References Cited

U.S. PATENT DOCUMENTS 5,009,477 A * 4/1991 Alferness ................ G06E 3/006
                                                      359/489.08
5,185,824 A * 2/1993 Grimes .................... G02B 6/32
                                                           349/196

(Continued)

FOREIGN PATENT DOCUMENTS

JP     2000-081541 A     3/2000
JP     2002-243985 A     8/2002

(Continued)

*Primary Examiner* — Rhonda S Peace
(74) *Attorney, Agent, or Firm* — Oliff PLC

(57) ABSTRACT

An optical wiring includes a plurality of first set groups each including a plurality of first connecting components, a plurality of second set groups each including a plurality of second connecting components, and a receptacle which has a first end face and a second end face on an opposite side of the first end face. The first set groups are connected to the first end face side and the second set groups are connected to the second end face side. The first set groups faces the second set groups through the receptacle such that a direction in which the first connecting components are arranged and a direction in which the second connecting components are arranged are perpendicular to each other, and each of the first connecting components is optically connected to a corresponding one of the second connecting components in the receptacle.

11 Claims, 7 Drawing Sheets

(56) References Cited

U.S. PATENT DOCUMENTS

| | | | |
|---|---|---|---|
| 5,600,748 A * | 2/1997 | Kosaka | G02B 6/3885 |
| | | | 385/139 |
| 5,887,095 A | 3/1999 | Nagase et al. | |
| 6,302,591 B1 | 10/2001 | Nagaoka et al. | |
| 6,493,480 B1 * | 12/2002 | Lelic | H04Q 11/0005 |
| | | | 385/16 |
| 8,403,570 B2 | 3/2013 | Fisher et al. | |
| 10,107,973 B2 * | 10/2018 | Sano | H04Q 11/0001 |
| 10,677,999 B2 * | 6/2020 | Leigh | G02B 6/3869 |
| 10,788,626 B1 * | 9/2020 | Leigh | G02B 6/3897 |
| 11,726,286 B2 * | 8/2023 | Filer | G02B 6/3885 |
| | | | 385/114 |
| 2014/0093211 A1 | 4/2014 | McColloch et al. | |
| 2014/0308008 A1 | 10/2014 | Mougin et al. | |
| 2017/0293092 A1 | 10/2017 | Sano et al. | |
| 2018/0252873 A1 | 9/2018 | Sano et al. | |
| 2018/0299625 A1 | 10/2018 | Fabian et al. | |
| 2019/0018209 A1 | 1/2019 | Takano et al. | |
| 2020/0064560 A1 | 2/2020 | Leigh et al. | |
| 2023/0288643 A1 * | 9/2023 | Nakanishi | G02B 6/3893 |

FOREIGN PATENT DOCUMENTS

| | | | | |
|---|---|---|---|---|
| JP | 2004-226665 A | 8/2004 | | |
| JP | 2012-530936 A | 12/2012 | | |
| JP | 2017-187644 A | 10/2017 | | |
| WO | 2010/147762 A1 | 12/2010 | | |
| WO | WO-2016121059 A1 * | 8/2016 | | H04B 10/00 |

\* cited by examiner

OPTICAL WIRING AND OPTICAL CONNECTION METHOD

TECHNICAL FIELD

The present disclosure relates to an optical wiring and an optical connection method. The present application claims priority from Japanese Patent Application No. 2020-155585 filed on Sep. 16, 2020, contents of which are incorporated by reference in its entirety.

BACKGROUND ART

Patent Literature 1 discloses a receptacle structure for connecting with a single-core optical connector. Patent Literature 2 discloses an optical connector in which a plurality of single-core ferrules are integrated.

CITATION LIST

Patent Literature

Patent Literature 1: U.S. Pat. No. 5,887,095A1
Patent Literature 2: US2019/0018209A1

SUMMARY OF INVENTION

An optical wiring according to an aspect of the present disclosure including: a plurality of first set groups each including a plurality of first connecting components which are each mounted with an optical fiber and which are arranged in a row; a plurality of second set groups each including a plurality of second connecting components which are each mounted with an optical fiber and which are arranged in a row; and a receptacle which has a first end face and a second end face on an opposite side of the first end face and in which the plurality of first set groups are connected to the first end face side and the plurality of second set groups are connected to the second end face side, in which a respective one of the plurality of first set groups faces a respective one of the plurality of second set groups through the receptacle such that a direction in which the first connecting components are arranged and a direction in which the second connecting components are arranged are perpendicular to each other, and a respective one of the plurality of first connecting components is optically connected to a respective one of the plurality of second connecting components in the receptacle.

An optical connection method according to an aspect of the present disclosure using a plurality of first set groups each including a plurality of first connecting components which are each mounted with an optical fiber and which are arranged in a row, a plurality of second set groups each including a plurality of second connecting components which are each mounted with an optical fiber and which are arranged in a row, and a receptacle which has a first end face and a second end face on an opposite side of the first end face and in which the plurality of first set groups are connected to the first end face side and the plurality of second set groups are connected to the second end face side, the method including: making a respective one of the plurality of first set groups face a respective one of the plurality of second set groups through the receptacle such that a direction in which the first connecting components are arranged and a direction in which the second connecting components are arranged are perpendicular to each other, and optically connecting a respective one of the plurality of first connecting components to a respective one of the plurality of second connecting components in the receptacle.

DESCRIPTION OF EMBODIMENTS

Technical Problem

Figure 1:
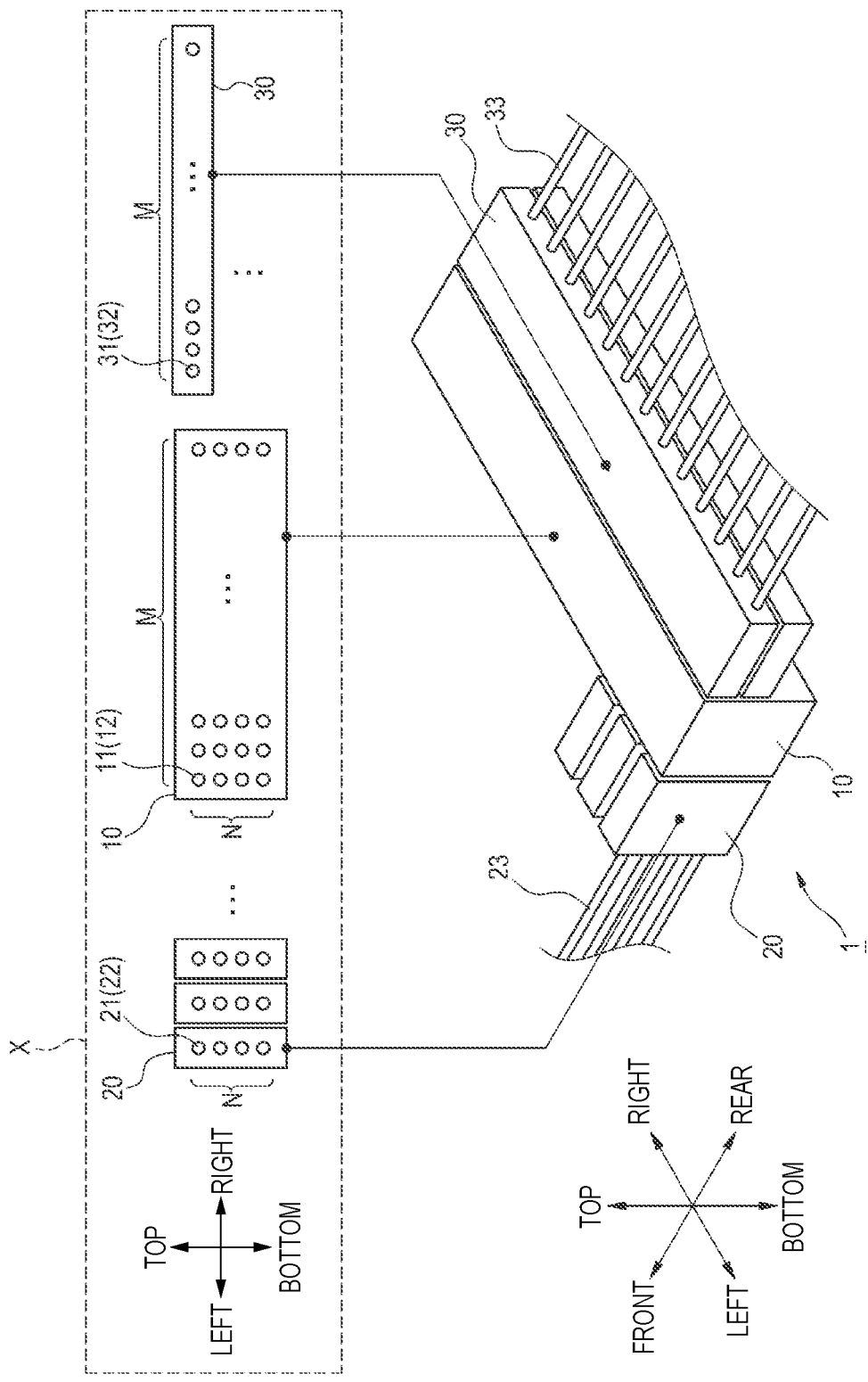
FIG. 1 is a schematic diagram showing an optical wiring according to one embodiment.

From the viewpoint of ease of wiring and the like, there is an increasing expectation for an optical transceiver including a receptacle that may be fitted with an optical connector in which a plurality of single-core ferrules are integrated as disclosed in Patent Literature 2. A concept of a basic receptacle structure is disclosed, for example, in Patent Literature 1. However, when a plurality of single-core receptacle structures as in Patent Literature 1 are provided so as to enable connection with the optical connector, there is a problem that wiring from a connection portion with the optical connector to a photoelectric conversion module tends to be complicated, and workability during mounting is reduced.

An object of the present disclosure is to improve workability during mounting an optical wiring including a ferrule and a receptacle.

Effects of Present Disclosure

According to the configuration disclosed above, it is possible to improve the workability during mounting an optical wiring.

Description of Embodiments of Present Disclosure

First, the embodiments of the present disclosure are listed and described. An optical wiring according to an aspect of the present disclosure including: a plurality of first set groups each including a plurality of first connecting components which are each mounted with an optical fiber and which are arranged in a row; a plurality of second set groups each including a plurality of second connecting components which are each mounted with an optical fiber and which are arranged in a row; and a receptacle which has a first end face and a second end face on an opposite side of the first end face and in which the plurality of first set groups are connected to the first end face side and the plurality of second set groups are connected to the second end face side, in which a respective one of the plurality of first set groups faces a respective one of the plurality of second set groups through the receptacle such that a direction in which the first connecting components are arranged and a direction in which the second connecting components are arranged are perpendicular to each other, and a respective one of the plurality of first connecting components is optically connected to a respective one of the plurality of second connecting components in the receptacle. When all the first connecting components are integrated, after the integrated first connecting components are fixed to the receptacle, work such as changing an order of each wiring becomes complicated. Meanwhile, according to the configuration described above, since the plurality of first connecting components are divided into the plurality of first set groups, it is possible to perform a changing work for each first set group. In addition, it is also possible to change an order of each wiring by changing a fixing direction of the first set group or changing a fixing position of the first set group. (The same applies to each second connecting component.) As a result, it is possible to improve the workability during mounting an optical wiring. In addition, as another effect that may be expected by the configuration described above, it is easy to divide a large-capacity optical signal into small-capacity optical signals for transmission and reception.

In the optical wiring, it is preferable that the plurality of second connecting components include a second connecting component for optical transmission mounted with an optical fiber that transmits an optical signal travelling from a respective one of the plurality of second connecting components to a respective one of the plurality of first connecting components, and a second connecting component for optical reception mounted with an optical fiber that transmits an optical signal travelling from a respective one of the plurality of first connecting components to a respective one of the plurality of second connecting components, and each of the plurality of second set groups includes only one of the second connecting component for optical transmission or the second connecting component for optical reception. According to this configuration, it is possible to further improve the workability in a case of mounting on an optical transceiver including an array including a plurality of transmission units and an array including a plurality of reception units.

In the optical wiring, it is preferable that each of the plurality of second set groups includes a plate that grips the plurality of second connecting components. According to this configuration, it is possible to form the second set group with a simple structure.

In the optical wiring, it is preferable that the plurality of second connecting components are held by the plate with a clearance between each of the plurality of second connecting components and the plate, and in a state in which the plurality of second connecting components are held by the plate, the plurality of second connecting components are movable with respect to the plate in a direction within a main surface of the plate and a direction perpendicular to the main surface of the plate, and are rotatable about axes along these directions. According to this configuration, in the state in which the second connecting components are held by the plate, each second connecting component has a so-called floating structure. As a result, for example, it is possible to prevent a situation that a posture of the second connecting component is fixed in a certain direction due to a stress from an optical fiber or the like extending toward the optical transceiver side, and prevent an increase in connection loss that may be caused by the situation.

In the optical wiring, it is preferable that the plate and at least one portion of the plurality of second connecting components each have an electrical conductivity, and in a state in which the plurality of second connecting components are held by the plate, when the plate and the plurality of second connecting components are viewed from a direction perpendicular to the plate, the portion hides the clearance. According to this configuration, when the plate and the portion are viewed from the direction perpendicular to the plate, it is easy to realize a state in which there is no non-conductive member, and the plate and the second connecting components may also function as an electromagnetic interference (EMI) shield.

In the optical wiring, it is preferable that the plurality of second set groups include a specific second set group and an adjacent second set group adjacent to the specific second set group, a specific plate of the specific second set group and an adjacent plate of the adjacent second set group each have an electrical conductivity, and the specific plate and the adjacent plate have respective overlapping portions that overlap each other when viewed from a direction perpendicular to the specific plate and the adjacent plate. According to this configuration, it is possible to prevent electromagnetic waves from leaking from a gap between adjacent plates. As a result, a high effect as an EMI shield may be expected.

In the optical wiring, it is preferable that the plate includes a plurality of insertion holes into which the plurality of second connecting components are inserted, and slits that connect the plurality of insertion openings. According to this configuration, it is possible to alleviate a pressing stress in a case of pressing a respective one of the second connecting components into a respective one of the insertion holes. In addition, by passing the optical fiber mounted on a respective one of the second connecting components through a respective one of the slits, the second connecting component may be inserted through the insertion hole from either of the faces of the plate, and the workability is improved.

In the optical wiring, it is preferable that the receptacle includes a first fitting portion, the plate includes a second fitting portion, and the first fitting portion and the second fitting portion are fitted to each other. According to this configuration, positioning the plate with respect to the receptacle is facilitated. As a result, it is possible to further improve the workability during mounting.

In the optical wiring, it is preferable that the plate is bent with respect to the main surface of the plate on at least one side. According to this configuration, it is possible to improve a mechanical strength of the plate. As a result, in a state in which the first connecting components and the second connecting components are connected to the receptacle, even when the plate receives a spring pressure derived from the first connecting components, the plate has a high durability against the spring pressure.

In the optical wiring, it is preferable that the plate includes a draw bead. According to this configuration, it is possible to improve the mechanical strength of the plate. As a result, in a state in which the first connecting components and the second connecting components are connected to the receptacle, even when the plate receives a spring pressure derived from the first connecting components, the plate has a high durability against the spring pressure.

In the optical wiring, it is preferable that the receptacle has an engagement groove, and the plate includes an engagement claw that elastically deforms and engageable with the engagement groove. According to this configuration, the plate may be easily attached to and detached from the receptacle, and thus, the workability during mounting may be further improved.

An optical connection method according to an aspect of the present disclosure using a plurality of first set groups each including a plurality of first connecting components which are each mounted with an optical fiber and which are arranged in a row, a plurality of second set groups each including a plurality of second connecting components which are each mounted with an optical fiber and which are arranged in a row, and a receptacle which has a first end face and a second end face on an opposite side of the first end face and in which the plurality of first set groups are connected to the first end face side and the plurality of second set groups are connected to the second end face side, the method including: making a respective one of the plurality of first set groups face a respective one of the plurality of second set groups through the receptacle such that a direction in which the first connecting components are arranged and a direction in which the second connecting components are arranged are perpendicular to each other, and optically connecting a respective one of the plurality of first connecting components to a respective one of the plurality of second connecting components in the receptacle. When all the first connecting components are integrated, after the integrated first connecting components are fixed to the receptacle, work such as changing an order of each wiring becomes complicated. Meanwhile, according to the configuration described above, since the plurality of first connecting components are divided into the plurality of first set groups, it is possible to perform a changing work for each first set group. In addition, it is also possible to change an order of each wiring by changing a fixing direction of the first set group or changing a fixing position of the first set group. (The same applies to each second connecting component.) As a result, it is possible to improve the workability during mounting an optical wiring. In addition, as another effect that may be expected by the configuration described above, it is easy to divide a large-capacity optical signal into small-capacity optical signals for transmission and reception.

Details of Embodiments of Present Disclosure

Hereinafter, examples of embodiments of the optical wiring according to the present disclosure will be described with reference to the drawings. In the following description, the same or corresponding elements are denoted by the same reference numerals or names even in different drawings, and redundant description will be appropriately omitted.

It should be noted that in the following description, terms of "front-rear direction", "left-right direction", and "top-bottom direction" may be used. The "front-rear direction" is a direction perpendicular to a surface of the receptacle to which the first set group is connected (a surface to which the second set group is connected). A direction from the receptacle to the first set group is a "front direction", and a direction from the receptacle to the second set group is a "rear direction". The "left-right direction" is a direction perpendicular to the front-rear direction, and is a direction in which the plurality of second connecting components are arranged in a state in which the second set group is connected to the receptacle. The "top-bottom direction" is a direction perpendicular to the front-rear direction, and is a direction in which the plurality of first connecting components are arranged in a state in which the first set group is connected to the receptacle. It should be noted that these directions are relative directions set to facilitate understanding of the present disclosure.

Figure 2:
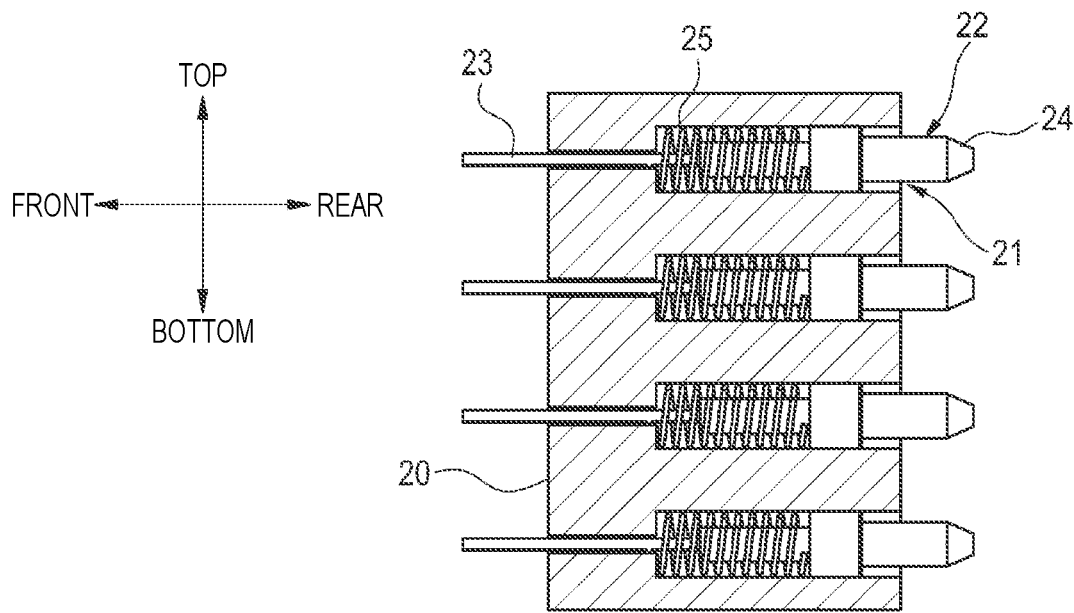
FIG. 2 is a partial cross-sectional view of a first set group included in the optical wiring shown in FIG. 1.

FIG. 1 is a schematic diagram showing an optical wiring 1 according to one embodiment of the present disclosure. FIG. 2 is a partial cross-sectional view of a first set group 20 shown in FIG. 1. As shown in FIG. 1, the optical wiring 1 includes a receptacle 10, the first set group 20, and a second set group 30. It should be noted that a lower part of FIG. 1 shows a schematic perspective view of the optical wiring 1, and an upper part (within range X) of FIG. 1 shows a schematic cross-sectional view of the receptacle 10, the first set group 20, and the second set group 30 cut along a plane including the top-bottom direction and the left-right direction.

A plurality of first set groups 20 are arranged in the left-right direction and connected to a surface of the receptacle 10 in the front direction (hereinafter also referred to as a first end face). A plurality of second set groups 30 are arranged in the top-bottom direction and connected to a surface of the receptacle 10 in the rear direction (hereinafter also referred to as a second end face). That is, a respective one of the plurality of first set groups is connected to a respective one of the plurality of second set groups 30 through the receptacle 10 such that a direction in which first connecting components 22 are arranged and a direction in which the second connecting components 32 are arranged are perpendicular to each other.

The receptacle 10 has N×M through holes 11 arranged in N rows (N is an integer of 2 or more) in the top-bottom direction and M rows (M is an integer of 2 or more) in the left-right direction. Each through hole 11 is a hole that penetrates the receptacle 10 in the front-rear direction. A split sleeve 12 is held in the through hole 11. It should be noted that N and M are not particularly limited as long as they are integers of 2 or more. N and M may be the same number or different numbers, but the number on the photoelectric conversion module (not shown) side (M in the example of FIG. 1) is preferably larger than the number on the other side (N in the example of FIG. 1). In the example shown in FIGS. 1, N=4 and M=13.

The first set group 20 has N through holes 21 arranged in the top-bottom direction. The first set group 20 grips, in each through hole 21, the first connecting component 22 mounted with an optical fiber 23. In addition, as shown in FIG. 2, the first connecting component 22 includes a ferrule 24 and a spring 25. The first set group 20 may be a so-called optical connector.

As shown in FIG. 1, the second set group 30 has M through holes 31 arranged in the left-right direction. The second set group 30 grips, in each through hole 31, the second connecting component 32 mounted with an optical fiber 33. An internal structure of the second set group 30 is not particularly limited, and may be an optical connector having a structure similar to that of the first set group 20, or a structure including a plate (see FIG. 3, etc.).

An end of the optical fiber 33 in the rear direction is connected to, for example, a photoelectric conversion module (not shown) connected to an electronic device. The optical fiber 33 includes one corresponding to an optical transmission function and one corresponding to an optical reception function. The optical fiber 33 corresponding to the optical transmission function transmits an optical signal from the photoelectric conversion module to the optical fiber 23 side. The optical fiber 33 corresponding to the optical reception function transmits an optical signal from the optical fiber 23 side to the photoelectric conversion module side.

It is preferable that each of the plurality of second set groups 30 includes only one of the second connecting component 32 for optical transmission mounted with the optical fiber 33 for optical transmission or the second connecting component for optical reception mounted with the optical fiber 33 for optical reception. For example, the second set group connected to the through hole 11 in the first row from the top in the receptacle 10 is configured to include only the second connecting component 32 for optical transmission, and the second set group 30 connected to the through hole 11 in the second row from the top is configured to include only the second connecting component 32 for optical reception. It should be noted that with such a configuration, one first set group 20 includes the first connecting component 22 for optical transmission and the first connecting component 22 for optical reception.

Figure 3:
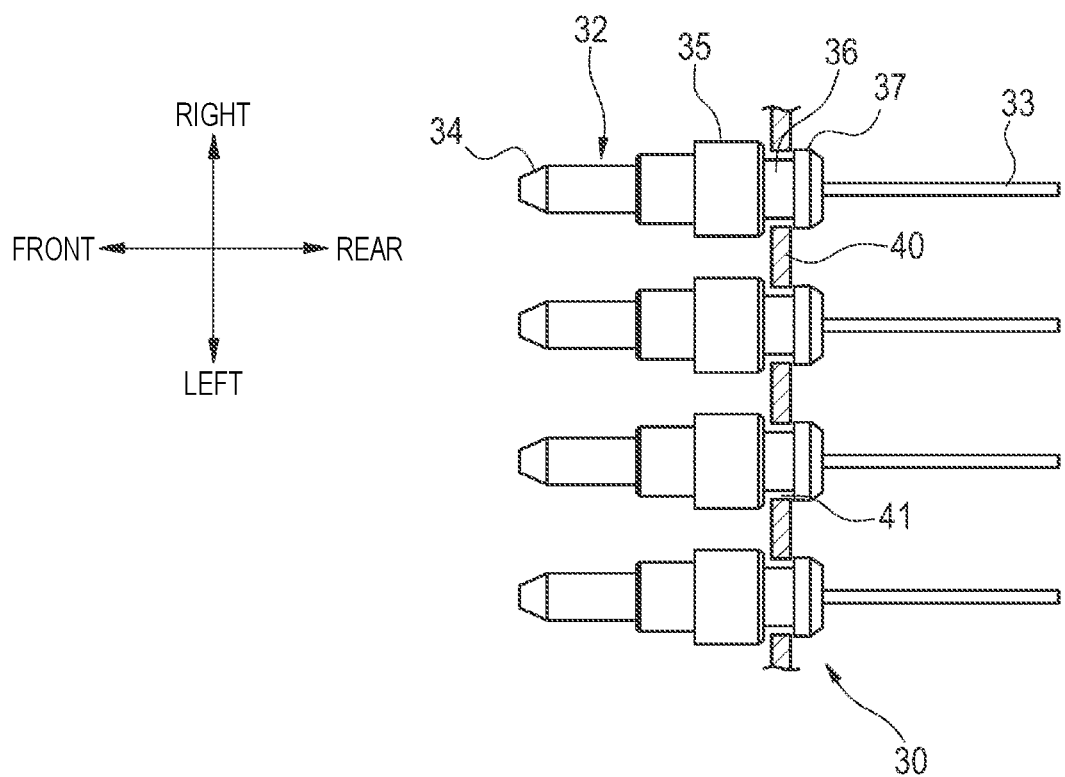
FIG. 3 is a schematic diagram showing an example of a second set group included in the optical wiring shown in FIG. 1.
Figure 4:
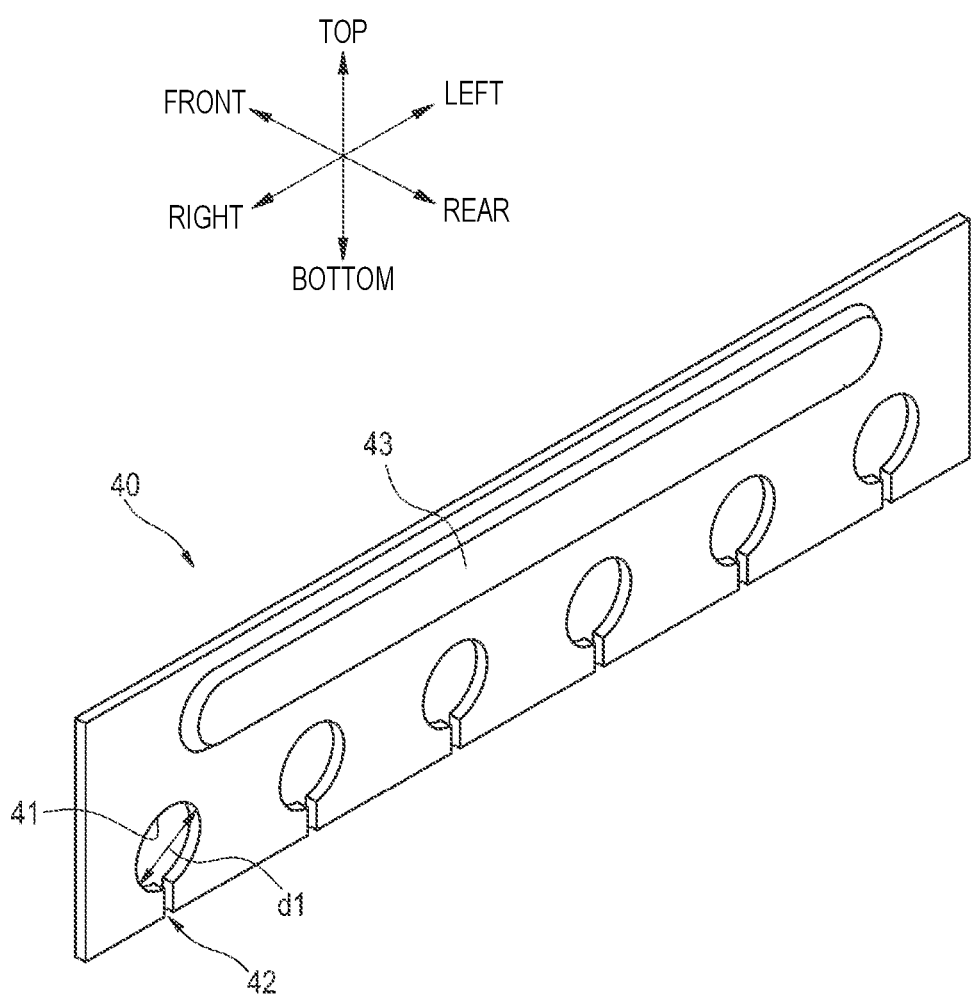
FIG. 4 is a perspective view of a plate included in the second set group shown in FIG. 3.
Figure 5:
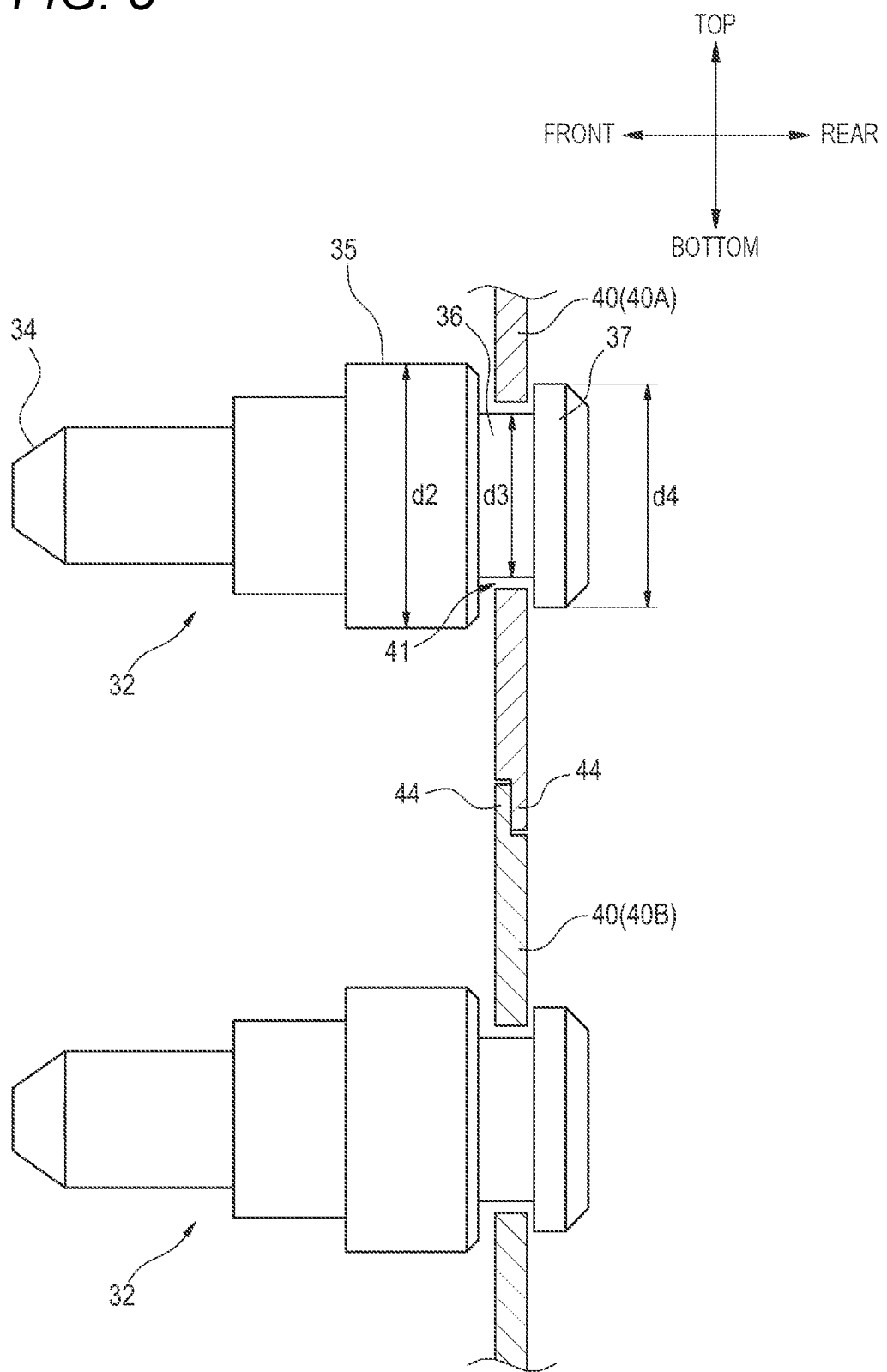
FIG. 5 is a schematic diagram showing an example of a state in which two adjacent plates grip a second connecting component.

Next, a case where the second set group 30 includes a plate 40 will be described with reference to FIGS. 3 to 5. FIG. 3 is a schematic diagram showing an example of the second set group 30. FIG. 4 is a perspective view of the plate 40 shown in FIG. 3. FIG. 5 is a schematic diagram showing an example of a state in which two adjacent plates 40 (40A and 40B) grip the second connecting component 32.

In the example of FIGS. 3 to 5, the second set group 30 includes M second connecting components 32 and the plate 40. The second connecting component 32 includes a ferrule 34, a large diameter portion 35, a small diameter portion 36, and a tail portion 37. The plate 40 includes M insertion holes 41, M slits 42, a protruding portion 43, and an adjacent portion 44. It should be noted that M is 6 in the example of FIGS. 3 to 5.

The second connecting component 32 is, for example, a fiber stub. The tail portion 37 is formed of, for example, a flexible material such as a resin. By pressing the tail portion 37 into the insertion hole 41, the small diameter portion 36 located between the large diameter portion 35 and the tail portion 37 is fitted into the insertion holes 41. That is, the second connecting component 32 is gripped by the plate 40. When the tail portion 37 is pressed into the insertion hole 41 as described above, the optical fiber 33 is passed through the slit 42 connecting the insertion hole 41 and one side of the plate 40. It should be noted that the large diameter portion 35 may be formed of a flexible material. When the large diameter portion 35 is flexible, the large diameter portion 35 may be pressed into the insertion hole 41.

A diameter d2 of the large diameter portion 35 and a diameter d4 of the tail portion 37 are each larger than a diameter d1 of the insertion hole 41. A diameter d3 of the small diameter portion 36 is smaller than the diameter d1. In addition, a length of the small diameter portion 36 is longer than a length of the insertion hole 41 in the front-rear direction. Accordingly, the second connecting components 32 are held by the plate 40 with a clearance between each of the plurality of second connecting components 32 and the plate 40. That is, the second connecting component 32 may move freely within the clearance range, but cannot come off from the plate 40. In other words, in a state in which the second connecting component 32 is held by the plate 40, the second connecting component 32 has a floating structure and thus is movable with respect to the plate 40 in two directions within a main surface of the plate 40 and a direction perpendicular to the main surface of the plate 40, and is rotatable about the three axes along the two direction within the main surface and the direction perpendicular to the main surface.

It should be noted that a length of the diameter d1 or the like is not limited to the above example. That is, the diameter d3 may be the same as the diameter d1. In addition, the length of the small diameter portion 36 in the front-rear direction may be the same as the length of the insertion hole 41 in the front-rear direction. In addition, shapes of the large diameter portion 35, the small diameter portion 36, and the tail portion 37 when viewed from the rear direction each may be a circular shape or a polygonal shape. When the shape of the large diameter portion 35 is a polygonal shape, the diameter d2 refers to a diameter of a circumscribed circle of the polygonal shape. The same applies to the small diameter portion 36 and the tail portion 37. In addition, the second connecting component 32 may be fixed to the plate 40 by a fixing method known in the related art such as gluing and welding.

A material of the plate 40 is a conductive material such as a metal or a conductive resin. Similarly, a material of the large diameter portion 35 is also a conductive material. In the state in which the second connecting component 32 is held by the plate 40, when the plate 40 and the large diameter portion 35 are viewed from a direction perpendicular to the plate 40, the plate 40 and the large diameter portion 35 have an overlapping portion around insertion hole 41. In addition, the insertion hole 41 is positioned inside the large diameter portion 35. Accordingly, the large diameter portion 35 and the plate 40 also function as an EMI shield. It should be noted that the tail portion 37 may be formed of a conductive material instead of or in addition to the large diameter portion 35. In this case, the tail portion 37 serves as a part of the EMI shield. It should be noted that electromagnetic waves are obtained, for example, by using the above-described electronic device as a generation source.

In addition, as shown in FIG. 5, in a state in which two second set groups 30 are connected to the receptacle 10, an adjacent portion 44 of the plate 40A adjacent to the plate 40B overlaps an adjacent portion 44 of the plate 40B. In the state of FIG. 5, the plate 40 is fixed to the receptacle 10 by a predetermined fixing unit (for example, a snap fit, a screw, etc.).

The protruding portion (draw bead) 43 is a portion obtained by protruding a portion of the plate 40 in the rear direction. The protruding portion 43 is formed by, for example, half punching.

Figure 6:
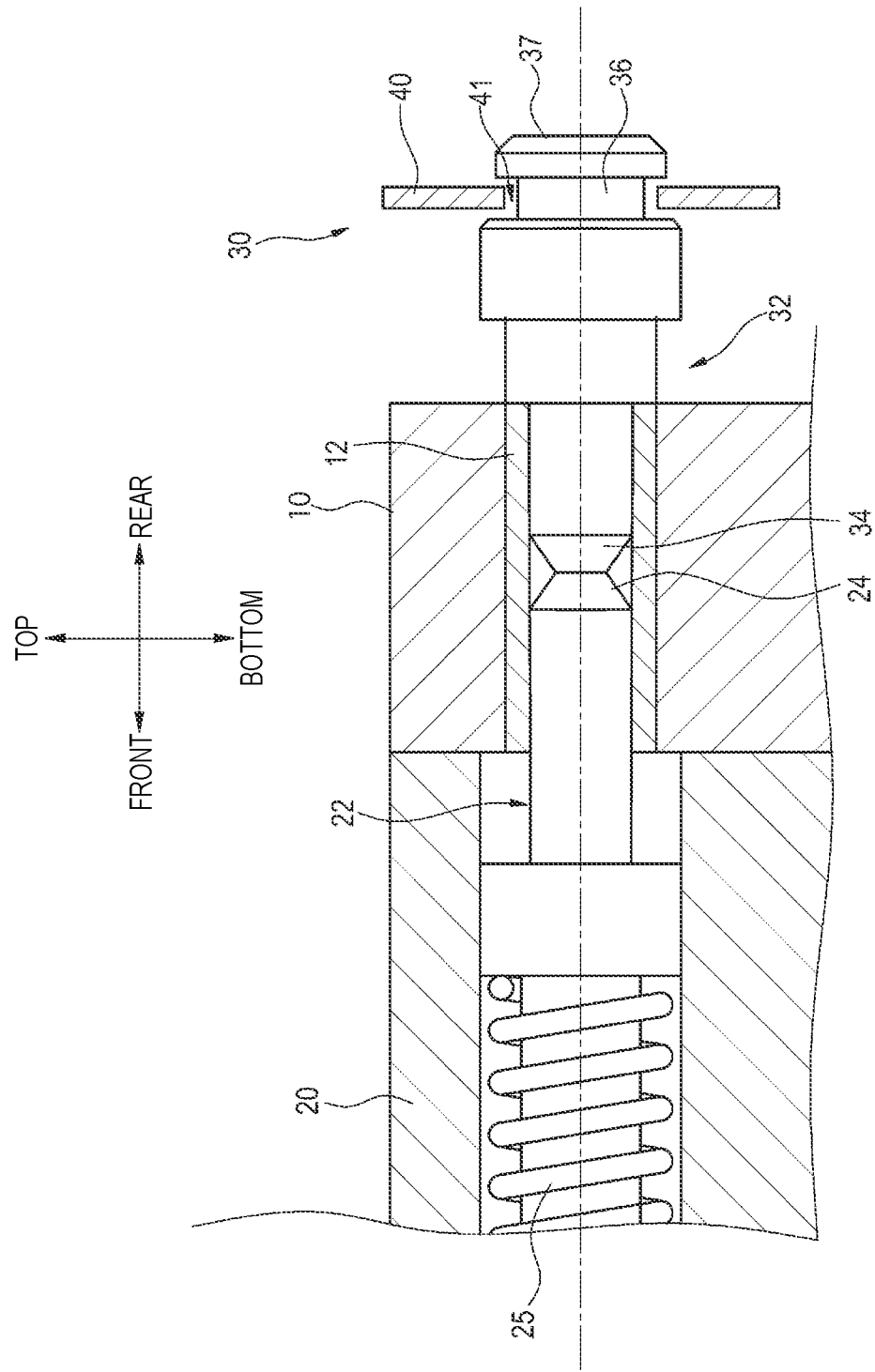
FIG. 6 is a schematic diagram showing an example of optical connection between a first connecting component and the second connecting component.

Next, optical connection between the first connecting component 22 and the second connecting component 32 will be described with reference to FIG. 6. FIG. 6 is a schematic diagram showing an example of the optical connection between the first connecting component 22 and the second connecting component 32. FIG. 6 shows a state in which the first set group 20 shown in FIG. 2 is connected to the first end face of the receptacle 10, and the second set group 30 shown in FIG. 3 is connected to the second end face of the receptacle 10.

A tip portion of the ferrule 24 is inserted into the split sleeve 12 of the receptacle 10. Similarly, a tip portion of the ferrule 34 is inserted into the split sleeve 12. Then, in the split sleeve 12, the tip portion of the ferrule 24 and the tip portion of the ferrule 34 are optically connected. It should be noted that since the second connecting component 32 has a floating structure with respect to the plate 40 as described above, even when some deviation occurs between a position of the insertion hole 41 and a position of the split sleeve 12 in a state in which the second set group 30 is held in the receptacle 10, there is little possibility that the optical connection in the split sleeve 12 is hindered. It should be noted that the ferrule 24 and the ferrule 34 are each a single-core ferrule.

The spring 25 applies a biasing force in the rear direction to the ferrule 24 during the optical connection described above, and prevents a gap from forming between the ferrule 24 and the ferrule 34. In addition, since a spring pressure is applied to the plate 40 by the biasing force, the protruding portion 43 is provided to improve the mechanical strength of the plate 40.

It should be noted that in the example of FIG. 6, the first set group 20 may be a structure including a plate. Similarly, the second set group 30 may be a structure which includes a spring and does not include a plate.

Figure 7:
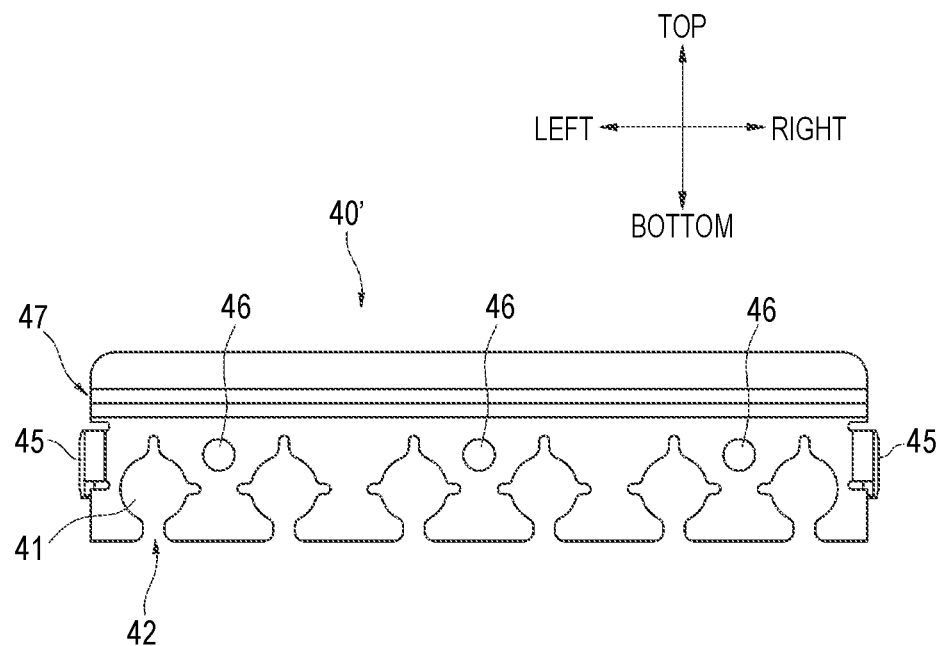
FIG. 7 is a front view showing another example of the plate.
Figure 8:
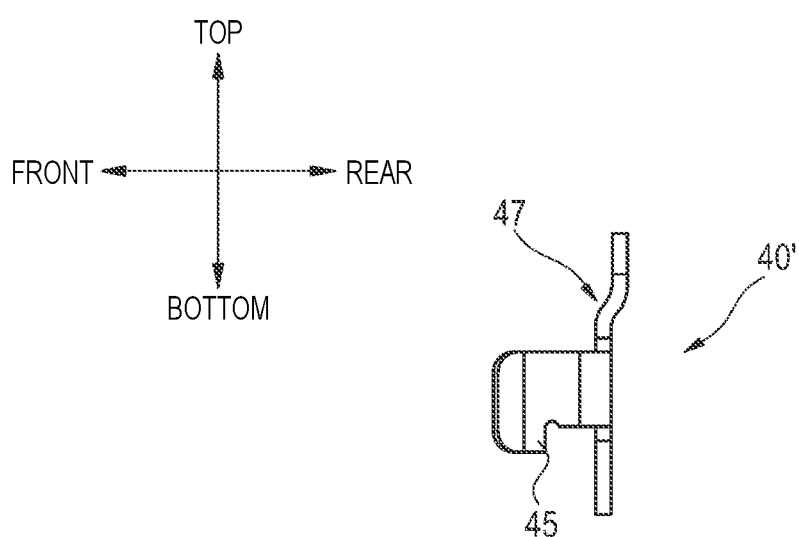
FIG. 8 is a side view of the plate shown in FIG. 7.
Figure 9:
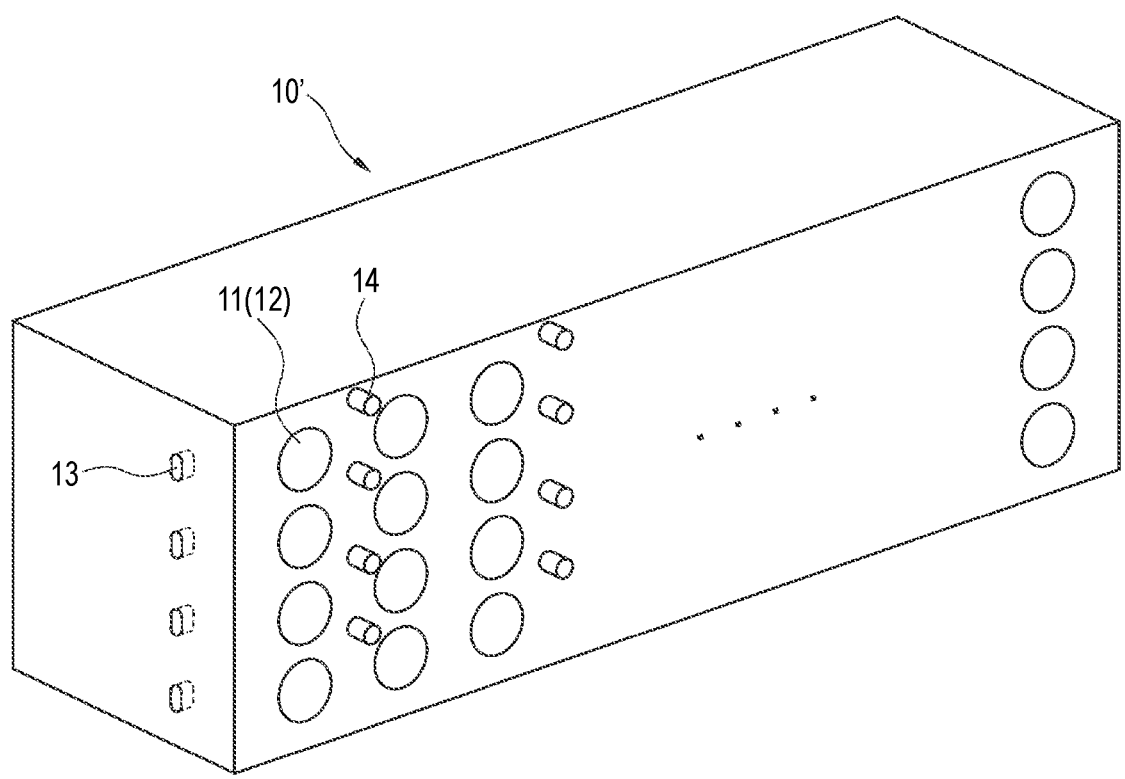
FIG. 9 is a schematic diagram showing an example of a receptacle corresponding to the plate shown in FIG. 7.

Next, a modification of the plate 40 will be described with reference to FIGS. 7 to 9. FIG. 7 is a front view showing another example of the plate 40. FIG. 8 is a side view of the plate 40' shown in FIG. 7. FIG. 9 is a schematic diagram showing an example of a receptacle 10' corresponding to the plate 40' shown in FIG. 7.

As shown in FIGS. 7 and 8, the plate 40' includes M insertion holes 41, M slits 42, engagement claws 45, a second fitting portion 46, and a structure bent with respect to a main surface of the plate 40' (bent structure 47). It should be noted that M is 6 in the example of FIGS. 7 and 8. In addition, the receptacle 10' shown in FIG. 9 includes N×M through holes 11 each holding the split sleeve 12 therein, engagement grooves 13, and a first fitting portion 14.

The engagement claws 45 are respectively provided on both ends of the plate 40'. The engagement claw 45 provided on a left end side includes a claw protruding toward a center from a left end of the plate 40'. Similarly, the engagement claw 45 provided on a right end side includes a claw protruding toward the center from a right end of the plate 40'. At least a part of the engagement claw 45 is flexible and engages with the engagement groove 13 by a snap fit. That is, the plate 40' and the receptacle 10' are detachably fixed by the engagement claw 45 and the engagement groove 13. It should be noted that there may be a groove on the plate 40' side and there may be a claw on the receptacle 10' side.

The second fitting portion 46 is a hole into which the first fitting portion 14 is fitted. The first fitting portion 14 is a projection that fits into the second fitting portion 46. When the engagement claw 45 is engaged with the engagement groove 13, positioning is performed to some extent by the second fitting portion 46 and the first fitting portion 14. It should be noted that there may be a projection on the plate 40' side and there may be a hole on the receptacle 10' side.

The bent structure 47 is a structure in which a portion of the plate 40' in the top direction is bent so as to protrude in the rear direction. Similar to the above-described protruding portion 43, the bent structure 47 contributes to improvement of the mechanical strength of the plate 40'.

In addition, the plate 40' is provided with a plurality of small slits in addition to the slits 42 each connecting the insertion hole 41 and one side (a side in the bottom direction) of the plate 40'. The small slits separately extend in the left direction, the right direction, and the top direction from the insertion hole 41, and are not connected to any side of the plate 40'. The small slits are provided in order to further alleviate the pressing stress in a case of pressing the second connecting component 32 into the insertion hole 41.

Although the present invention has been described in detail with reference to specific embodiments, it will be apparent to those skilled in the art that various changes and modifications may be made without departing from the scope of the present invention. The numbers, positions, shapes, and the like of the components described above are not limited to those in the above embodiment, and may be changed to suitable numbers, positions, shapes, and the like on a premise that the present invention is achieved.

REFERENCE SIGNS LIST

1: optical wiring
10, 10': receptacle
11: through hole
12: split sleeve
13: engagement groove
14: first fitting portion
20: first set group
21: through hole
22: first connecting component
23: optical fiber
24: ferrule
25: spring
30: second set group
31: through hole
32: second connecting component
33: optical fiber
34: ferrule
35: large diameter portion
36: small diameter portion
37: tail portion
40, 40', 40A, 40B: plate
41: insertion hole
42: slit
43: protruding portion
44: adjacent portion
45: engagement claw
46: second fitting portion
47: bent structure

The invention claimed is:

1. An optical wiring comprising:
a plurality of first set groups each including a plurality of first connecting components which are each mounted with an optical fiber and which are arranged in a row;
a plurality of second set groups each including a plurality of second connecting components which are each mounted with an optical fiber and which are arranged in a row; and
a receptacle which has a first end face and a second end face on an opposite side of the first end face and in which the plurality of first set groups are connected to the first end face side and the plurality of second set groups are connected to the second end face side,
wherein:
the plurality of first set groups faces the plurality of second set groups through the receptacle such that a direction in which the first connecting components are arranged and a direction in which the second connecting components are arranged are perpendicular to each other, and each of the plurality of first connecting components is optically connected to a corresponding one of the plurality of second connecting components in the receptacle,
the plurality of second connecting components include a second connecting component for optical transmission mounted with an optical fiber that transmits an optical signal travelling from one of the plurality of second connecting components to one of the plurality of first connecting components, and a second connecting component for optical reception mounted with an optical fiber that transmits an optical signal travelling from one of the plurality of first connecting components to one of the plurality of second connecting components, and each of the plurality of second set groups includes only one of the second connecting component for optical transmission or the second connecting component for optical reception.

2. The optical wiring according to claim 1, wherein each of the plurality of second set groups includes a plate that grips the plurality of second connecting components.

3. The optical wiring according to claim 2, wherein the plurality of second connecting components are held by the plate with a clearance between each of the plurality of second connecting components and the plate, and in a state in which the plurality of second connecting components are held by the plate, the plurality of second connecting components are movable with respect to the plate in two directions within a main surface of the plate and a direction perpendicular to the main surface of the plate, and are rotatable about axes along the two directions within the main surface and the direction perpendicular to the main surface.

4. The optical wiring according to claim 3, wherein the plate and at least one portion of the plurality of second connecting components each have an electrical conductivity, and in a state in which the plurality of second connecting components are held by the plate, when the plate and the plurality of second connecting components are viewed from a direction perpendicular to the plate, the portion hides the clearance.

5. The optical wiring according to claim 2, wherein the plurality of second set groups include a specific second set group and an adjacent second set group adjacent to the specific second set group, a specific plate of the specific second set group and an adjacent plate of the adjacent second set group each have an electrical conductivity, and the specific plate and the adjacent plate have respective overlapping portions that overlap each other when viewed from a direction perpendicular to the specific plate and the adjacent plate.

6. The optical wiring according to claim 2, wherein the plate includes a plurality of insertion holes into which the plurality of second connecting components are inserted, and slits that connect the plurality of insertion openings.

7. The optical wiring according to claim 2, wherein the receptacle includes a first fitting portion, the plate includes a second fitting portion, and the first fitting portion and the second fitting portion are fitted to each other.

8. The optical wiring according to claim 2, wherein the plate is bent with respect to the main surface of the plate on at least one side.

9. The optical wiring according to claim 2, wherein the plate includes a draw bead.

10. The optical wiring according to claim 2, wherein the receptacle has an engagement groove, and the plate includes an engagement claw that elastically deforms and engageable with the engagement groove.

11. An optical connection method using a plurality of first set groups each including a plurality of first connecting components which are each mounted with an optical fiber and which are arranged in a row, a plurality of second set groups each including a plurality of second connecting components which are each mounted with an optical fiber and which are arranged in a row, and a receptacle which has a first end face and a second end face on an opposite side of the first end face and in which the plurality of first set groups are connected to the first end face side and the plurality of second set groups are connected to the second end face side, the method comprising:

making one of the plurality of first set groups face one of the plurality of second set groups through the receptacle such that a direction in which the first connecting components are arranged and a direction in which the second connecting components are arranged are perpendicular to each other, and optically connecting each of the plurality of first connecting components to a corresponding one of the plurality of second connecting components in the receptacle, wherein the plurality of second connecting components include a second connecting component for optical transmission mounted with an optical fiber that transmits an optical signal travelling from one of the plurality of second connecting components to one of the plurality of first connecting components, and a second connecting component for optical reception mounted with an optical fiber that transmits an optical signal travelling from one of the plurality of first connecting components to one of the plurality of second connecting components, and each of the plurality of second set groups includes only one of the second connecting component for optical transmission or the second connecting component for optical reception.

* * * * *